(12) United States Patent
Winter et al.

(10) Patent No.: US 6,330,342 B1
(45) Date of Patent: Dec. 11, 2001

(54) METHOD FOR THE CONTROL OF COLORS

(75) Inventors: Steven B. Winter, Highland Park; Stanley I. Lerner, Glencoe, both of IL (US)

(73) Assignee: Color Communications, Inc., Chicago, IL (US)

( * ) Notice: Subject to any disclaimer, the term of this patent is extended or adjusted under 35 U.S.C. 154(b) by 0 days.

(21) Appl. No.: 09/258,109

(22) Filed: Feb. 25, 1999

(51) Int. Cl.$^7$ ...................................................... G06K 9/00
(52) U.S. Cl. ........................... 382/100; 382/162; 356/402
(58) Field of Search .................................... 382/100, 108, 382/109, 162, 165, 209; 358/1.9, 518; 356/402, 408, 425; 434/81, 98

(56) References Cited

U.S. PATENT DOCUMENTS

| | | | |
|---|---|---|---|
| 3,043,710 | 7/1962 | Patten et al. ........................ | 428/480 |
| 3,158,494 | 11/1964 | Eikvar et al. ......................... | 117/45 |
| 3,158,495 | 11/1964 | Murray et al. . | |
| 3,224,113 | 12/1965 | Goldsholl .............................. | 434/98 |
| 3,234,038 | 2/1966 | Stephens et al. .................... | 428/328 |
| 3,312,563 | 4/1967 | Rusch .................................. | 428/480 |
| 3,322,605 | 5/1967 | Frech . | |
| 3,335,029 | 8/1967 | Holben . | |
| 3,434,227 | 3/1969 | Brown ................................. | 434/98 |
| 3,511,213 | 5/1970 | Reed . | |
| 3,753,769 | 8/1973 | Steiner ................................ | 428/331 |
| 3,967,009 | 6/1976 | Blake . | |
| 4,058,645 | 11/1977 | Steiner ................................ | 428/331 |
| 4,061,521 | 12/1977 | Lerner et al. ........................ | 156/265 |
| 4,104,809 | 8/1978 | Day et al. ............................ | 434/104 |
| 4,146,031 | 3/1979 | Fujiyama et al. .................... | 428/328 |
| 4,379,696 | 4/1983 | Lerner ................................. | 428/339 |
| 4,457,718 | 7/1984 | Lerner ................................. | 434/98 |
| 5,845,001 | * 12/1998 | Thomas .............................. | 382/100 |
| 5,907,495 | * 5/1999 | Snyder et al. ....................... | 358/529 |
| 6,043,894 | * 3/2000 | Van Aken et al. .................... | 356/402 |
| 6,108,095 | * 8/2000 | Graf ..................................... | 356/402 |
| 6,122,391 | * 9/2000 | Ringland et al. .................... | 382/100 |

FOREIGN PATENT DOCUMENTS

| | | |
|---|---|---|
| 1232971 | 5/1971 | (GB) . |
| 1509791 | 5/1978 | (GB) . |

OTHER PUBLICATIONS

Earth colors (TM) A Guide for Soil & Earthtone Colors, including a manual in a pocket of the book, copyright 1997.
EarthColors® The Globe Program (TM) Edition, A guide for Soil and Earthtone Colors, copyright 1996.
The Institute for Color Research, Color Response Dictionary. This is a "color fan", copyright 1999.
The Wagner Color Response (TM) Report, copyright 1988.
Hercules Technical Literature Report No. CSL–82A, No Date.
Minolta Spectrophotometer CM–3700d, Hardware Manual, 1994.
Minolta Spectrophotmeter CM–3700d, Communication Manual, 1994.
Minolta Intrument Systems, SpectraMatch for Windows, Color Formulation Program, User's Manual Version 1.0, No date.
Brochure, Minolta Spectrophotometer Cm–3700d, 1994.

\* cited by examiner

*Primary Examiner*—Bhavesh Mehta
(74) *Attorney, Agent, or Firm*—Fitch, Even, Tabin & Flannery

(57) ABSTRACT

The invention is directed to controlling and/or managing a marketing color on mass-produced articles. According to the invention, an unmanaged marketing color is managed over time where mass-produced samples having the unmanaged marketing color are periodically tested or audited to confirm that the unmanaged marketing color and/or a part of the mass-produced articles conforms to a master color standard.

16 Claims, 3 Drawing Sheets

FIG. 1

PRODUCT COLOR EVALUATION   COLOR MATCH QUALIFICATION REPORT #___

(980800 format)

GENERAL

Figure 3:
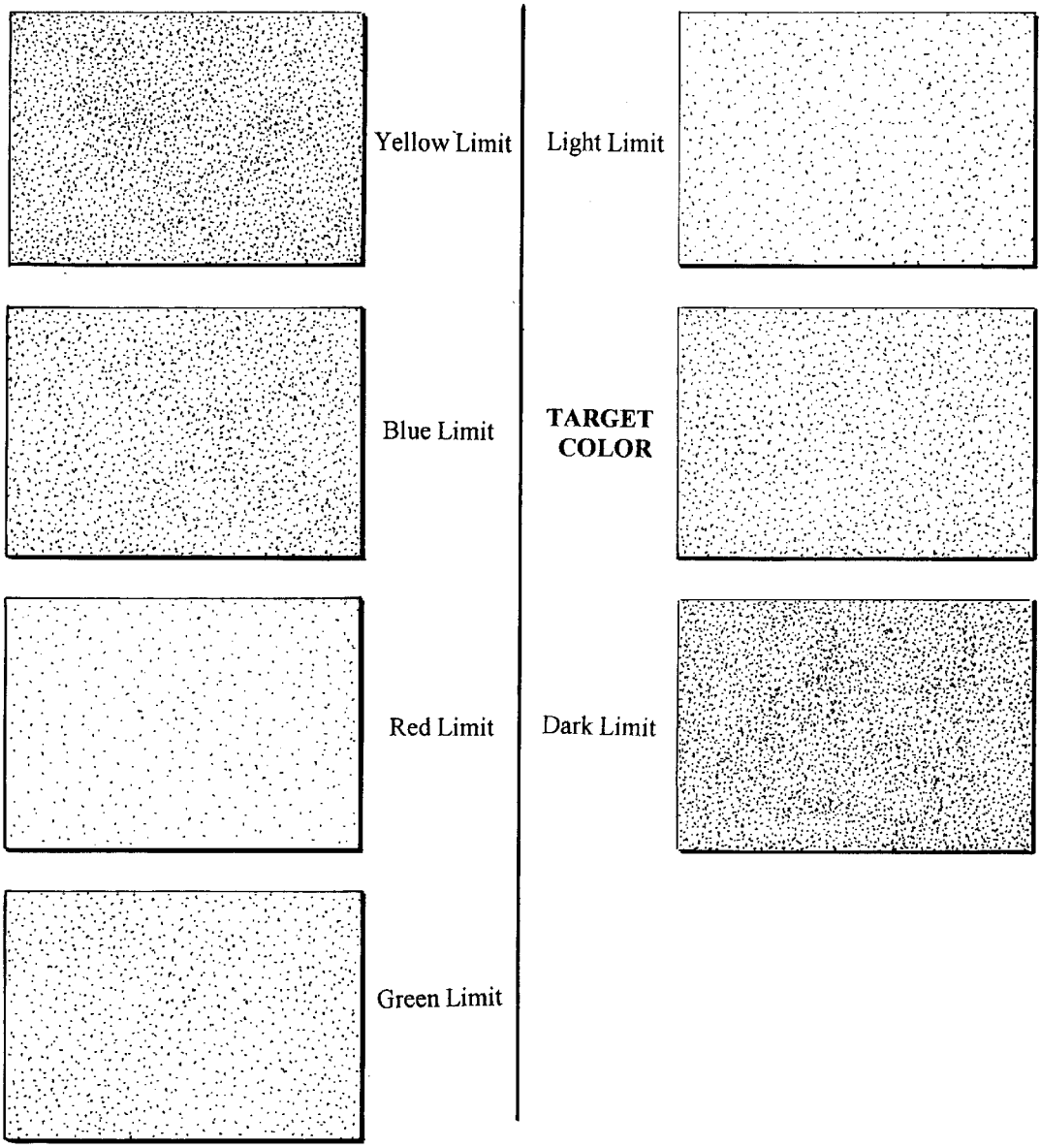

| | |
|---|---|
| COLOR NAME: _____ | SUPPLIER NAME: _____ |
| COLOR STD. # _____ | MATERIAL: _____ |
| PRODUCT APPLICATION: _____ | COLOR ID: _____ |

SURFACE

| | STANDARD | MATCH/SAMPLE | SPECIFICATIONS |
|---|---|---|---|
| GLOSS UNITS @ 60° | _____ | _____ | COATING = 10 - 14 |

VISUAL EVALUATION

| | VISUAL COMMENTS | IS COLOR ACCEPTABLE? |
|---|---|---|
| CIE CWF ILLUMINANT | _____ | |
| CIE A ILLUMINANT | _____ | |
| CIE D65 ILLUMINANT | _____ | |

INSTRUMENTAL EVALUATION

| INSTRUMENT CONDITIONS: | CIE 94 | 10° OBSERVER | | SPECULAR GLOSS INCLUDED | |
|---|---|---|---|---|---|
| Metamerism DIN | DL* | Da* | Db* | DC* | DE *94 |

REFLECTION ☐          SEE ATTACHED REPORT

TRANSMISSION ☒

INSTRUMENTAL EVALUATION

CONCLUSION    COMMENTS: _____

REPORT SENT TO: _____          EVALUATION BY: _____

DATE: _____

FIG. 2
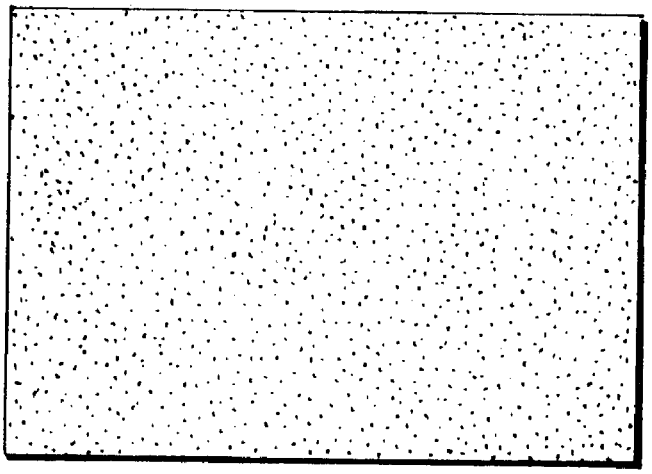
Light Limit
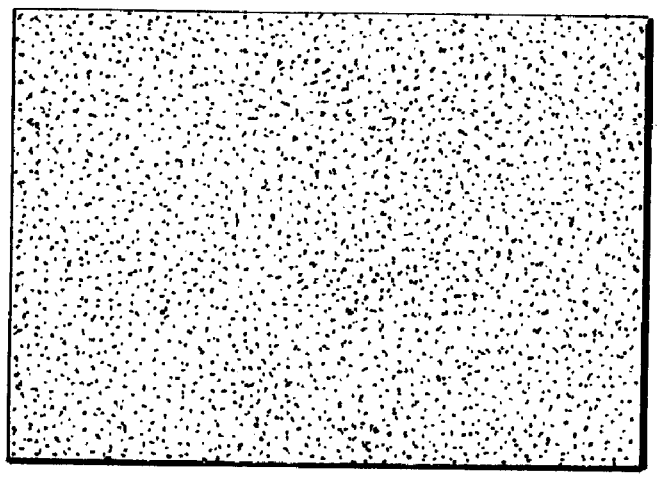
TARGET COLOR
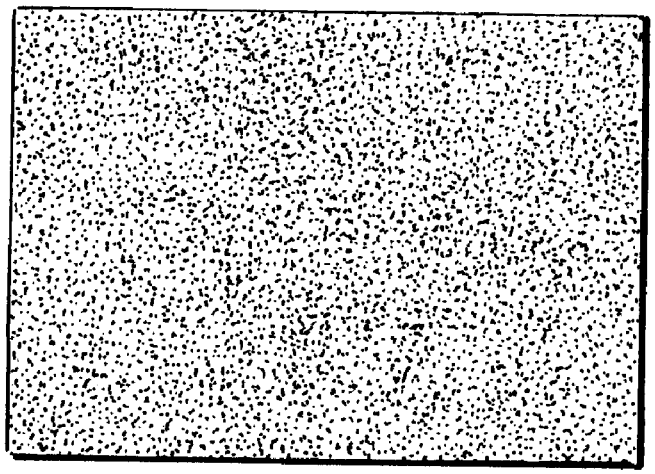
Dark Limit

METHOD FOR THE CONTROL OF COLORS

FIELD OF THE INVENTION

This invention is directed to the controlling and/or managing a marketing color which is associated with or is used to identify goods or services. More particularly, the invention is directed to the control, managing and/or the auditing of a marketing color over time where samples of an unmanaged marketing color on or a part of mass produced articles are periodically tested or audited to confirm that an unmanaged marketing color on or a part of the mass produced articles conforms to a master color standard established for the marketing color.

BACKGROUND OF THE INVENTION

Color has become increasingly important in marketing goods. Color may be part of a trademark, service mark or in some way be associated with the product itself. Multinational companies which market their products throughout the world in countries having different languages have become to rely on their marks which include color to identify their products or services as coming from the same source although that source may not be expressly identified by name. Customers have become to expect that the identification of the products will be the same. Coca Cola is not only famous for its "Coke" trademark, but people have come to expect that the when the color red is used with the "Coke" name, it will be a characteristic red. The same is true of the gold color associated with the gold or yellow used in the arches and the printed arches on McDonalds structures and packages. More, recently Apple Computer Company is using color on the housings of its computers and wants all of its computers of a particular style to look precisely alike, including the color of the computer.

Companies which use color to identify their goods and services, and particularly large companies which have their marketing materials and/or products made by a plurality of vendors, have an acute problem in not only controlling the quality of their products, but also have a problem in controlling the color used in association with their marks which identify their goods or services. This corporate identification is often one of the most valuable assets of the company.

The problem of color control also should be recognized as more sophisticated than just having a color sample of the desired color and matching the desired color sample with the color being mass produced for the marketing color. Signs for business establishments may be used outside and may be illuminated by daylight or both daylight and fluorescent light. Color will appear different depending upon the type of light used to illuminate the color. Hence, it is important to control a marketing color with a recognition of the type of light with which the marketing color will be illuminated. Further, the marketing color will be produced by diverse vendors. Coca Cola may have its packaging and signs produced world wide. Hence, printers in Chicago, Ill., Turkey and China need guidance as to how to produce the same "Coke" red in their respective regions. This is not an intuitive task when there is a recognition of the diverse number of pigments there are to produce a color. As a result, expertise is needed to help the printer or formulator determine substantially the fewest number of commonly available pigments which are required to produce a color which matches a master color standard and advising those who produce the color which commonly available pigments may be used to produce the color.

Heretofore, there has been no or very little systematic means to control a marketing color which is applied to or forms a part of mass produced articles, particularly mass produced printed colors where ink has been applied to a substrate. This lack of control is particularly evident in connection with identifying how the color will visually appear under a plurality of light conditions and determining the fewest number of commonly available pigments which are required to produce a color which matches a master color standard.

It is an object of the invention to provide a method and system for the control of a marketing color on mass produced articles.

It is another object of the invention to provide a method and system for the control of a marketing color where the color is illustrated on mass produced articles by a printing ink which is printed on a substrate.

It is another object of the invention to provide a method and system for the control of a marketing color where the color is part of a mass produced pigmented plastic article.

It is yet another object of the invention to provide a method and system for the control and/or audit of a marketing color on mass produced articles where the color will be viewed under a plurality of lighting conditions and where the method and system include a determination of substantially the fewest number of commonly available pigments required to produce a color which matches a master color standard.

It still another object of the invention to provide a method and system for the control and audit of a marketing color on mass produced articles where the control and/or audit of the color is done more than once or a number of times over a continuing period of time to monitor the production of the marketing color over a period of time.

SUMMARY OF THE INVENTION

This invention is directed to controlling and/or managing a marketing color on mass produced articles, particularly where the marketing color is used on or is a part of a mass produced article, or where the marketing color is associated with or is used to identify goods or services. In one aspect, the invention is a process which is repeated over time as an audit of samples of mass produced articles which have the marketing color or colors so that a consistent marketing color is maintained during the mass production of the articles with the marketing color. In a particularly important aspect, the marketing color is or is a part of a service mark or trade mark which is used to identify goods or services. The method of the audit provided by the invention includes:

establishing a master color standard for a marketing color which is used on mass produced articles;

establishing acceptable machine tolerances from at least one visual tolerance set for a mass produced marketing color under at least one predetermined lighting condition, the machine tolerances being limits which the mass produced marketing color can deviate from the master color standard for the acceptable display of the mass produced marketing color under the at least one predetermined lighting condition in which the mass produced marketing color is to be viewed;

obtaining at least one sample of the mass produced article having a mass produced unmanaged marketing color;

machine measuring a plurality of spectrophotometric characteristics of the at least one visual tolerance set and storing the plurality of characteristics of the at least one visual tolerance set on a storage medium;

machine measuring one or more of the plurality of spectrophotometric characteristics, which were measured of the at least one visual tolerance set, of the unmanaged marketing color of the at least one sample of the mass produced article;

determining if the machine measured spectrophotometric characteristics of the unmanaged color of the sample of the mass produced articles are within the established acceptable machine tolerances established for the mass produced marketing color;

accepting or rejecting the unmanaged color of the sample based upon the machine measurements of the unmanaged color of the mass produced sample and the at least one visual tolerance set;

visually comparing a visual color standard with the unmanaged color of the sample of the mass produced article under a plurality of types of light by looking at the unmanaged color of the sample of the mass produced article and the visual color standard at least one predetermined angle with the unmanaged color of the mass produced sample and the visual color standard being illuminated by each of the plurality of the types of light to determine if the unmanaged color of the mass produced sample and the visual color standard are with at least one visual tolerance for the mass produced marketing color; and accepting or rejecting the unmanaged color of the mass produced sample of the mass produced article based upon the visual comparison.

The visual color standard is established by a visual tolerance set which may be the same visual tolerance set used to established the machine tolerances. The visual tolerance set may have as few as three elements or samples (a three-step test) or as many as seven elements or samples (a seven-element test), the more elements the more demanding the tolerance.

In an important aspect, the audit is continued over time of production of the mass produced articles by taking one or more additional samples of the mass produced article with the unmanaged color, repeating the machine measurement of the unmanaged color of the additional samples of the mass produced article, repeating the determination of whether the unmanaged color of the additional samples is within the established acceptable machine tolerances, accepting or rejecting the unmanaged color of the additional samples based upon the repeated machine measurement of the unmanaged color of the additional samples, repeating the visual comparison of the unmanaged color of the additional samples with the visual color standard and accepting or rejecting the unmanaged color of the one or more additional samples based upon the visual comparison.

In another aspect, the method of the invention includes selecting substantially the minimum number of pigments which are required to obtain the color of the master color standard and meet the visual and machine tolerances to be able to accept an unmanaged color made with substantially the minimal number of pigments after the machine measuring and visual comparing the unmanaged color with visual color standard set. The use of substantially the minimal number of pigments has been found to help assure reproducability of the color throughout diverse world wide locations where pigments for a color may be mixed.

In another important aspect, the method of the invention is directed to auditing the color of a marketing color which is mass produced by printing the color with ink on a base substrate. An important aspect of controlling and auditing the color of such mass produced printed material is to make the master color standard and visual tolerance set with a paint by making the paint with substantially the minimum color pigments, then coat the paint on a substrate to emulate the printed marketing color. In this aspect, the invention includes preparing a pigmented paint using substantially the minimum number of pigments to obtain a master color standard and which are to be used in the applied printing ink. This establishes a master color standard for the applied printing ink which is to be used to illustrate the marketing color. At least one visual tolerance set also is prepared using paints and applying them to a substrate. A plurality of spectrophotometric characteristics of the visual tolerance set are machine measured and are stored on a storage medium. The method also includes establishing acceptable machine tolerances for an unmanaged color of the applied printing ink under at least one predetermined lighting condition. These machine tolerances are limits which the color of the applied printing ink can deviate from the master color standard for the acceptable display of the color of the applied printing ink under the at least one predetermined lighting condition in which the identification of goods or services is to take place. These machine tolerances may be established by storing on a storage medium acceptable color deviations from the visual tolerance set. In one aspect the visual tolerance set may be the master color standard and two color samples which are acceptably lighter and darker than the master color standard.

Samples of the mass produced printed articles are obtained with the printing ink applied thereon. The applied printing ink has an unmanaged marketing color. A plurality of spectrophotometric characteristics, which were measured for the visual tolerance set, are also machine measured for the unmanaged color of the applied printing ink on the mass produced samples. Thereafter, it is determined if the machine measured characteristic of the unmanaged color of the applied printing ink on the mass produced samples are within the established acceptable machine tolerances established for the color of the applied printing ink so that the unmanaged color of the applied printing ink on the mass produced samples may be accepted or rejected based upon the machine measurements of the spectrophotometric characteristics of the visual tolerance set. A visual color standard (which may be the master color standard and/or two or more visual color samples which may acceptably deviate from the master color standard) and the mass produced samples having the unmanaged color of the applied printing ink also are visually compared under a plurality of types of light by looking at the unmanaged color. The sample and the visual color standard are illuminated by each of the plurality of the types of light to determine if the unmanaged color of the applied printing ink and the visual color standard are with at least one visual tolerance for the unmanaged color of the applied printing ink. Thereafter the mass produced samples are accepted if the mass produced sample is within the visual tolerance, if not the sample is rejected based upon the visual comparison.

DETAILED DESCRIPTION OF THE INVENTION

Figures
 FIG. 1. Color Evaluation Report.
 FIG. 2. Three-Step Visual Tolerance Set.
 FIG. 3. Seven-step Visual Tolerance Set.

DEFINITIONS

As used herein, "marketing color" means a color or colors used on or form a part of a mass produced article. The color may be a part of a pigmented plastic, may be painted on an article or printed on an article. In an important aspect the color may be a part of a service mark, trade mark, or is otherwise associated with goods or services where the goods or services are not themselves a paint or ink.

As used herein, an "unmanaged color" is a color on a product or forms part of a trade or service mark which color has not been compared to a color standard.

As used herein, "audit" or "color audit" means a periodic examination over time of a color which is a part of and/or is on mass produced articles where the articles themselves with an unmanaged color are examined or compared to a master color standard.

As used herein, "paint" means a composition which is a blend which includes one or more pigments and film forming constituents, which blend when applied to a substrate surface provides a continuous closely adherent film which when dried is capable of primarily serving a protective function, and optionally, a communicative and/or decorative function. In general paint provides a continuous film (without small holes or discontinuous areas) which when pigmented is substantially opaque.

As used herein, "sink" means a composition which generally is applied as a very thin quick drying composition which results in a discontinuous film which when dry does not primarily serve as a protective function, but rather serves a communicative or decorative function.

As used herein, "mass produced" is an article of manufacture such as printed material, signs, or any other article of manufacture which is produced in large quantities by a repetitive action.

As used herein "plastic" means any polymer which includes carbon and hydrogen which may be formed into an article by injection molding or extrusion.

Details of the Invention

According to the invention an unmanaged marketing color is managed, controlled and/or audited over time where mass produced samples having the unmanaged marketing color are periodically tested or audited to confirm that the unmanaged marketing color on or a part of the mass produced articles conforms to a master color standard which has been established for the marketing color. The master color standard is established using substantially the minimum number of pigments required to obtain the master color of the master color standard.

Machine and visual tolerances are established for the master color standard. This is done by determining what type or types of light under which a marketing color will be illuminated and determining the viewing angle at which the marketing color is likely to be viewed. After the master color standard is set, visual tolerance sets are established. In its most basic form, a visual tolerance set includes the master color standard and two colors on samples. The colors on the samples visually appear nearly identical to the master color standard under a plurality of types of light, are not identical, but are visually acceptable to those marketing the articles which include a marketing color when the samples which are a part of the visual tolerance set are viewed under the types of light under which the articles with the marketing color are likely to be viewed. The color standard and the lighter and darker samples form a three-step tolerance set (FIG. 2). A more elaborate visual tolerance set may be established, especially for establishing machine tolerances. A seven-step visual tolerance set (FIG. 3) may be established with the three-step set plus a sample slightly, but acceptably redder than the master color standard, a sample slightly, but acceptably bluer than the master color standard, a sample slightly, but acceptably greener than the master color standard, and a sample slightly, but acceptably yellower than the master color standard. Depending on the degree of precision desired, the three or the seven-step visual tolerance sets can be used to establish the visual and machine tolerances. In general the three-step set will be used to establish the visual tolerance standard and the seven-step set will establish the machine tolerances.

The visual standard used in the visual comparison of the unmanaged color with the visual standard, however, may be a visual tolerance set which does not necessarily include the master color standard. The same is true of the sets which are used to set the machine tolerances, but it is preferable to use sets which include the master color standard.

The master color standard, visual tolerance sets and visual color standard are made to emulate the surface characteristics of the mass produced product which will include and illustrate the marketing color. Hence, if the product is a rough metal surface, the standards and sets are made to emulate such surface. If the surface is a shiny plastic, the standards are made to emulate such a surface. Indeed, if the mass produced product is a pigmented plastic, the standards and sets also should preferably be pigmented plastic samples.

Spectrophotometric characteristics of the visual tolerance set which is to be used to set the machine tolerances, and preferably as noted above, the master color standard as well, are machine measured. These measurements may be made by any commercially available software color evaluation program, such as Spectra Match For Windows, available from Minolta Instrument Systems, Minolta Corporation. Using this type of software, the tolerance samples and the master color standard are inserted into a spectrophotometer, which is commercially available as models CM 500, CM 2000, CM 3200d and CM 3500d from Minolta Instrument Systems, 101 Williams Drive, Ramsey, N.J. These machine measured characteristics establish the machine tolerances from a visual tolerance set. These machine measured spectrophotometric characteristics are stored on a medium, such as a hard drive on a personal computer, using the color matching software.

According to the invention, samples of the mass produced articles are obtained and their unmanaged marketing color is machine measured on the spectrophotometer. These characteristics are then compared to the machine measured characteristics for the visual tolerance set which includes the visual color samples and/or the master color standard which have been stored. If the machine measured spectrometric characteristics of the mass produced samples are within the limits of the machine measured characteristics of the visual tolerance set, represented by the visual tolerance samples and/or master color standard, then the mass produced samples may be passed onto the further step of visual inspection and visual comparison with the visual tolerance standard, such as the three-step visual tolerance set which preferably includes the master color standard as well as the lighter and darker visual tolerance samples. For more precise inspections, the seven-step visual tolerance set may be used in the visual inspection.

The visual inspection and comparison of the mass produced samples and the visual tolerance sets are done in a light box having a plurality of light sources for illumination of the samples. Typically the light box will include a source for a daylight type of light, a source for an incandescent type of light, a source for a blue (cool)/white type of light, and a source for a horizon type of light. Light boxes are commercially available under the name Macbeth Spectralight II, models SPL-50, SPL-65 and SPL-75 from Kollmorgen Instruments Corporation, Newburgh, N.Y. The mass produced sample(s) are compared to the visual tolerance set by viewing them in the light box at angles of from about 35 to about 55 degrees and preferably at about 45 degrees. Typically, as noted above, the tolerance samples of the visual tolerance set will provide a color which is slightly (but acceptably) lighter and sightly darker (but acceptably darker) than the master color standard. Further the mass produced sample(s) are tested to determine if it is metameric (the color does not change under different types of light). Typically it is required that a marketing color is not metameric.

When the marketing color is on printed articles made with printing ink, the master color standard and the visual tolerance samples of the visual tolerance set are made with paint, not ink. Paint is used because its color is more readily controlled when applied over various substrates. In this aspect of the invention, substantially the minimum number of pigments is determined to make the master color standard and visual tolerance samples. Then a paint is made, such as a lacquer base paint, to duplicate and/or approximate the colors of the ink when applied to a substrate which is used to illustrate the marketing color. Thereafter the paint is applied to a substrate, such as a paper or plastic substrate (such as polyethylene terephthalate or polypropylene) to emulate the ink with the marketing color after printing. The substrate should be carefully selected to emulate the surface which will be printed as sa part of the mass-produced article. The paint may be applied with a knife or with a roller or other convenient means known in the art. These painted articles provide a master color standard and visual tolerance samples for the visual tolerance set to be used in auditing the printed marketing color as described above.

After it is determined whether the mass produced marketing color is within the machine and visual tolerances established for the color, a color evaluation report is made to report the results of the machine and visual comparisons described above. This report is illustrated in FIG. 1.

What is claimed is:

1. A method for managing a marketing color used on mass produced articles, the method comprising:

establishing a master color standard for the marketing color which is used on mass produced articles;

establishing machine tolerances for a mass produced marketing color under at least one predetermined lighting condition, the machine tolerances being limits which the mass produced marketing color on the mass produced articles can deviate from the master color standard for the acceptable display of the mass produced marketing color under the at least one predetermined lighting condition in which the mass produced marketing color is to be viewed;

obtaining at least one sample of the mass produced article having a mass produced unmanaged color;

machine measuring a plurality of spectrophotometric characteristics of a first visual tolerance set and storing the plurality of characteristics of the first visual tolerance on a storage medium;

machine measuring one or more of the plurality of spectrophotometric characteristics, which were measured of the first visual tolerance set, of the unmanaged color of the at least one sample of the mass produced article;

determining if the machine measured spectrophotometric characteristic of the unmanaged color of the sample of the mass produced articles are within the established acceptable machine tolerances established for the mass produced marketing color;

accepting or rejecting the unmanaged color of the sample based upon the machine measurements of the unmanaged color of the color sample and the first visual tolerance set;

visually comparing a visual color standard with the unmanaged color of the mass produced sample under a plurality of types of light by looking at the unmanaged color of the mass produced sample and the visual color standard at least one predetermined angle with the unmanaged color of the mass produced sample and the visual color standard being illuminated by each of the plurality of the types of light to determine if the unmanaged color of the mass produced sample and the visual color standard are within at least one visual tolerance established for the marketing color of the mass produced sample; and accepting or rejecting the unmanaged color of the mass produced sample based upon the visual comparison.

2. A method as recited in claim 1 where the method is repeated over time for the unmanaged color of one or more additional color samples, the method further comprising repeating the machine measurement of the unmanaged color of the one or more additional mass produced samples, repeating the determination of the unmanaged color of one or more additional mass produced samples is within the established acceptable machine tolerances, accepting or rejecting the unmanaged color of the one or more additional mass produced samples based upon the repeated machine measurement of the unmanaged color of the one or more additional mass produced samples, repeating the visual comparison of the unmanaged color of the one or more additional mass produced samples with the visual color standard and accepting or rejecting the unmanaged color of the one or more additional mass produced samples based upon the visual comparison to audit the a marketing color which is a part of the mass produced samples.

3. A method as recited in claims 1 or 2 wherein the visual color standard is a second visual tolerance set which has two sample colors, one of which is acceptably lighter than the master color standard, and one which is acceptably darker than the master color standard.

4. The method as recited in claims 1 or 2, wherein the first visual tolerance set is a seven-step set.

5. A method for managing a color of an applied printing ink used to illustrate a marketing color which marketing color is used on mass produced articles, the method comprising:

preparing a pigmented paint to establish a master color standard which is to emulate the color of the applied printing ink which ink is to be used to illustrate the marketing color on mass produced articles;

establishing machine tolerances for a mass produced printed color of the applied printing ink under at least one predetermined lighting condition, the machine tolerances being limits which the mass produced marketing color of the applied printing ink on the mass produced articles can deviate from the master color standard for the acceptable display of the marketing color of the applied printing ink under the at least one predetermined lighting condition in which the mass produced marketing color is to be viewed;

obtaining at least one sample of the mass produced article having the printing ink applied thereon, the applied printing ink having a mass produced unmanaged marketing color;

machine measuring a plurality of spectrophotometric characteristics of a first visual tolerance set and storing the plurality of characteristics of the first visual tolerance set on a storage medium;

machine measuring one or more of the plurality of spectrophotometric characteristics, which were measured of the first visual tolerance set, of the unmanaged color of the applied printing ink on the mass produced sample;

determining if the at least one of the machine measured characteristic of the unmanaged color of the applied printing ink on the mass produced sample are within the established machine tolerances established for the marketing color of the applied printing ink;

accepting or rejecting the unmanaged color of the applied printing ink on the sample based upon the machine measurements of the unmanaged color of the applied printing ink and the first visual tolerance set;

visually comparing a visual color standard with the unmanaged color of the applied printing ink on the mass produced sample under a plurality of types of light by looking at the unmanaged color of the applied printing ink and the visual color standard at least one predetermined angle with the unmanaged color of the applied printing ink on the mass produced sample and the visual color standard being illuminated by each of the plurality of the types of light to determine if the unmanaged color of the applied printing ink and the visual color standard are within at least one visual tolerance for the unmanaged color of the applied printing ink; and accepting or rejecting the unmanaged color of the applied printing ink based upon the visual comparison.

6. A method as recited in claim 5 wherein the method is repeated over time for the unmanaged color of one or more additional color samples, the method further comprising repeating the machine measurement of the unmanaged color of the one or more additional mass produced samples, repeating the determination of the unmanaged color of one or more additional mass produced samples is within the established acceptable machine tolerances, accepting or rejecting the unmanaged color of the one or more additional mass produced samples based upon the repeated machine measurement of the unmanaged color of the one or more additional mass produced samples, repeating the visual comparison of the unmanaged color of the one or more additional mass produced samples with the visual color standard and accepting or rejecting the unmanaged color of the one or more additional mass produced samples based upon the visual comparison to audit the a marketing color which is a part of the mass produced samples.

7. A method as recited in claims 5 or 6 wherein the visual color standard is a second visual tolerance set which has two sample colors, one of which is acceptably lighter than the master color standard, and one which is acceptably darker than the master color standard.

8. The method as recited in claims 5 or 6, wherein the first visual tolerance set is a seven-step set.

9. A method for managing a color of an applied printing ink used to illustrate a marketing color which marketing color is used on mass produced articles, the method comprising:

preparing a pigmented paint using substantially the minimum number of pigments to be used in printing g ink which is to be applied onto mass produced articles to establish a master color standard which is to emulate the color of the applied printing ink which ink is to be used to illustrate the marketing color on the mass produced articles;

establishing machine tolerances for a mass produced printed color of the applied printing ink under at least one predetermined lighting condition, the machine tolerances being limits which the mass produced marketing color of the applied printing ink on the mass produced articles can deviate from the master color standard for the acceptable display of the marketing color of the applied printing ink under the at least one predetermined lighting condition in which the mass produced marketing color is to be viewed;

obtaining at least one sample of the mass produced article having the printing ink applied thereon, the applied printing ink having a mass produced unmanaged marketing color;

machine measuring a plurality of spectrophotometric characteristics of a first visual tolerance set and storing the plurality of characteristics of the first visual tolerance set on a storage medium;

machine measuring one or more of the plurality of spectrophotometric characteristics, which were measured of the first visual tolerance set, of the unmanaged color of the applied printing ink on the mass produced sample;

determining if the at least one of the machine measured characteristic of the unmanaged color of the applied printing ink on the mass produced sample are within the established acceptable machine tolerances established for the marketing color of the applied printing ink;

accepting or rejecting the unmanaged color of the applied printing ink on the sample based upon the machine measurements of the unmanaged color of the applied printing ink and the first visual tolerance set;

visually comparing a visual color standard with the unmanaged color of the applied printing ink on the mass produced sample under a plurality of types of light by looking at the unmanaged color of the applied printing ink and the visual color standard at least one predetermined angle with the unmanaged color of the applied printing ink on the mass produced sample and the visual color standard being illuminated by each of the plurality of the types of light to determine if the unmanaged color of the applied printing ink and the visual color standard are within at least one visual tolerance for the unmanaged color of the applied printing ink; and accepting or rejecting the unmanaged color of the applied printing ink based upon the visual comparison.

10. A method as recited in claim 9 wherein the method is repeated over time for the unmanaged color of one or more additional color samples, the method further comprising repeating the machine measurement of the unmanaged color of the one or more additional mass produced samples, repeating the determination of the unmanaged color of one or more additional mass produced samples is within the established acceptable machine tolerances, accepting or rejecting the unmanaged color of the one or more additional mass produced samples based upon the repeated machine measurement of the unmanaged color of the one or more additional mass produced samples, repeating the visual comparison of the unmanaged color of the one or more additional mass produced samples with the visual color standard and accepting or rejecting the unmanaged color of the one or more additional mass produced samples based upon the visual comparison to audit the a marketing color which is a part of the mass produced samples.

11. A method as recited in claims 9 or 10 wherein the visual color standard is a second visual tolerance set which has two sample colors, one of which is acceptably lighter than the master color standard, and one which is acceptably darker than the master color standard.

12. A method as recited in claims 9 or 10 wherein the first visual tolerance set is a seven-step set.

13. A system for managing a marketing color used on mass produced articles, the system comprising:

a computer processor for processing data;

a master color standard for the marketing color;

a visual tolerance standard for the marketing color;

a spectrophotometer for measuring a plurality of characteristics of the color of the master color standard and a visual color standard;

a storage medium for storing the plurality of spectrophotometric characteristics of the master color standard and visual tolerance standard;

means for comparing the machine measured spectrophotometric characteristics of the master color standard visual color standard and an unmanaged marketing color on a sample of mass produced articles;

a light display apparatus having at least two types of light sources for the visual display of the sample of the mass produced article under each of the light sources and effective for comparison of the visual color standard with the unmanaged marketing color on the sample of the mass produced articles under each of the light sources; and a sample color evaluation report which identifies the unmanaged marketing color on the sample of the mass produced article, reports at least one of a plurality of machine measured characteristics of the unmanaged color on the sample color of the mass produced article and reports whether the unmanaged marketing color on the mass produced sample is within the machine and visual tolerances established for the marketing color.

14. A system in accordance with claim 13 wherein the visual color standard and the master color standard emulate the color of ink, and the visual color standard and the master color standard comprise a substrate coated with paint, which paint emulates the color of ink applied to a substrate.

15. A system in accordance with claims 13 or 14 wherein the visual color standard is the master color standard.

16. A system in accordance with claims 13 or 14 wherein the visual color standard is a second visual tolerance set which has two sample colors, one of which is acceptably lighter than the master color standard, and one which is acceptably darker than the master color standard.

* * * * *